(12) United States Patent
Hauck

(10) Patent No.: US 8,905,210 B2
(45) Date of Patent: Dec. 9, 2014

(54) PARALLEL DUAL CLUTCH DEVICE

(75) Inventor: Hans Juergen Hauck, Schwaebisch Hall (DE)

(73) Assignee: BorgWarner Inc., Auburn Hills, MI (US)

( * ) Notice: Subject to any disclaimer, the term of this patent is extended or adjusted under 35 U.S.C. 154(b) by 164 days.

(21) Appl. No.: 13/609,570

(22) Filed: Sep. 11, 2012

(65) Prior Publication Data

US 2013/0081917 A1    Apr. 4, 2013

(30) Foreign Application Priority Data

Sep. 29, 2011    (DE) .......................... 10 2011 115 286

(51) Int. Cl.
| | |
|---|---|
| *F16D 21/06* | (2006.01) |
| *F16D 25/10* | (2006.01) |
| *F16D 21/02* | (2006.01) |
| *B60K 6/485* | (2007.10) |

(52) U.S. Cl.
CPC ........ *F16D 21/02* (2013.01); *F16D 2021/0692* (2013.01); *F16D 2021/0661* (2013.01); *F16D 21/06* (2013.01); *Y02T 10/6226* (2013.01); *B60K 6/485* (2013.01)
USPC .................................... 192/48.614; 192/70.2

(58) Field of Classification Search
CPC .............................................. F16D 2021/0692
USPC .................................................... 192/48.614
See application file for complete search history.

(56) References Cited

U.S. PATENT DOCUMENTS 7,246,692 B2 *    7/2007    Braford .................... 192/48.611

FOREIGN PATENT DOCUMENTS

| DE | 10146606 A1 | 4/2003 |
|---|---|---|
| DE | 10 2007 008 946 A1 * | 2/2008 |

* cited by examiner

*Primary Examiner* — Rodney H Bonck
(74) *Attorney, Agent, or Firm* — BrooksGroup

(57) ABSTRACT

One variation may include a parallel, preferably wet, dual clutch device (2) for arrangement in a drive train of a motor vehicle, between a drive unit (4) and a transmission (6), which has a first multiplate clutch (30) assigned to a first transmission input shaft (10) and having a first plate assembly (38), a first actuating piston (46), a first inner plate carrier (36) and a first outer plate carrier (34) for selective torque transmission between the drive unit (4) and the first transmission input shaft (10), and has a second multiplate clutch (32) assigned to a second transmission input shaft (12) and having a second plate assembly (44), a second actuating piston (48), a second inner plate carrier (42) and a second outer plate carrier (40) for selective torque transmission between the drive unit (4) and the second transmission input shaft (12), wherein the actuating pistons (46, 48) have mutually opposed actuating directions (50, 52). The inner plate carriers (36, 42) are each designed as the input side and the outer plate carriers (34, 40) are each designed as the output side of the first and second multiplate clutches (30, 32).

13 Claims, 1 Drawing Sheet

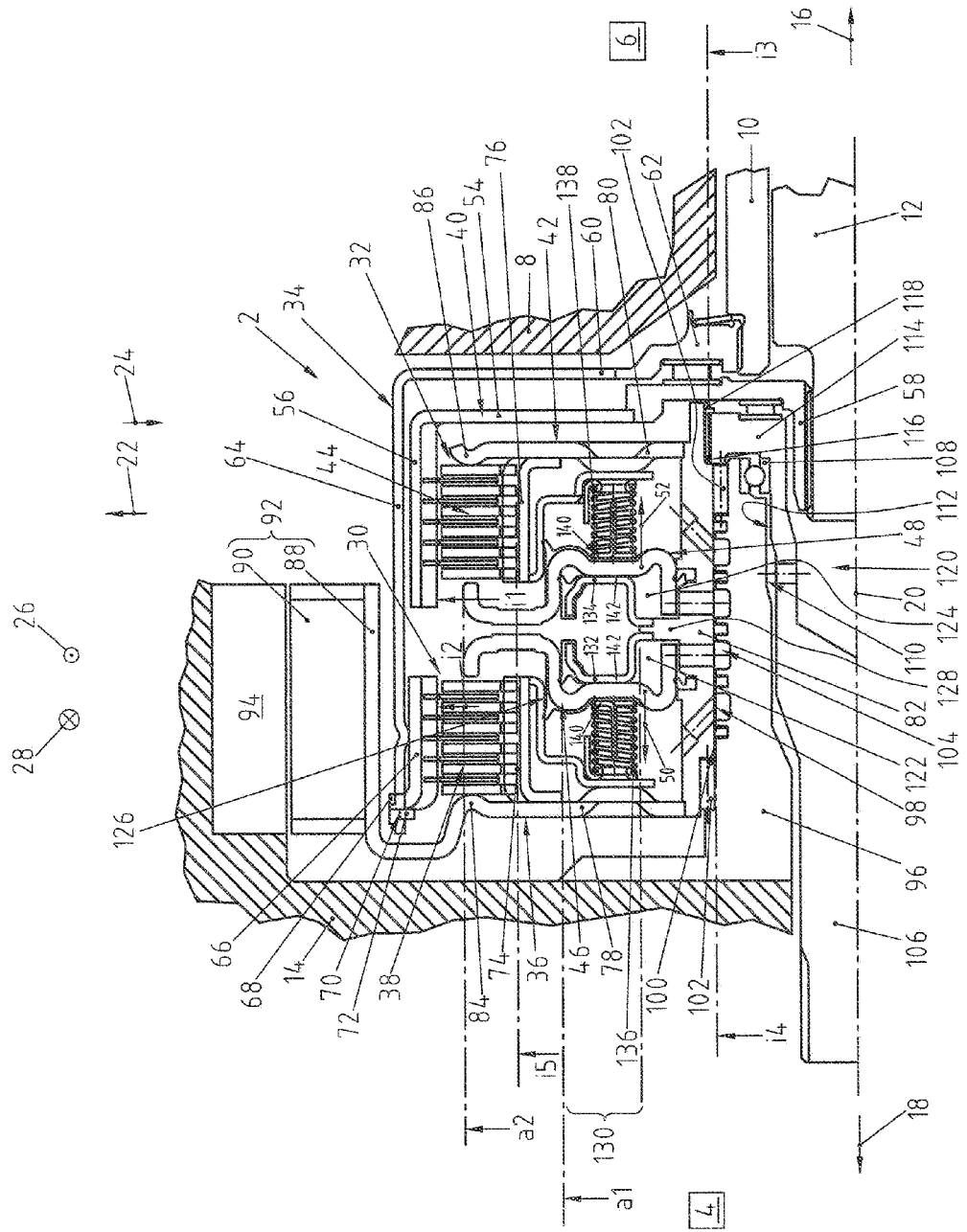

PARALLEL DUAL CLUTCH DEVICE

The present invention relates to a parallel dual clutch device for arrangement in a drive train of a motor vehicle, between a drive unit and a transmission.

DE 101 46 606 A1 describes a parallel dual clutch device. The known dual clutch device has a first multiplate clutch assigned to a first transmission input shaft and having a first plate assembly, a first actuating piston, a first inner plate carrier and a first outer plate carrier for selective torque transmission between the drive unit and the first transmission input shaft. Moreover, the known dual clutch device has a second multiplate clutch assigned to a second transmission input shaft, which, in a corresponding manner, has a second plate assembly, a second inner plate carrier, a second actuating piston, and a second outer plate carrier in order to allow selective torque transmission between the drive unit and the second transmission input shaft. The actuating pistons used to actuate the multiplate assemblies have mutually opposed actuating directions. The two inner plate carriers of the known dual clutch device each form the output side of the associated multiplate clutch, while the outer plate carriers each form the input side of the associated multiplate clutch.

The known dual clutch devices have proven their worth but are disadvantageous inasmuch as they are of relatively complex construction, which furthermore makes the assembly of the dual clutch device more difficult.

It is therefore an object of the present invention, starting from a dual clutch device of the type in question, to provide a parallel dual clutch device, the construction and assembly of which is simplified.

This object is achieved by the features indicated herein in claim 1. Advantageous embodiments of the invention are the subject matter of the dependent claims.

The dual clutch device according to the invention is designed for arrangement in a drive train of a motor vehicle, between a drive unit and a transmission. The dual clutch device has a first multiplate clutch assigned to a first transmission input shaft and having a first plate assembly, a first actuating piston for actuating the plate assembly, a first inner plate carrier and a first outer plate carrier for selective torque transmission between the drive unit and the first transmission input shaft. The first actuating piston is preferably a hydraulically drivable first actuating piston. Moreover, the dual clutch device according to the invention comprises a second multiplate clutch assigned to a second transmission input shaft and having a second plate assembly, a second actuating piston, a second inner plate carrier and a second outer plate carrier for selective torque transmission between the drive unit and the second transmission input shaft. The second actuating piston for actuating the second plate assembly is also preferably a hydraulically drivable actuating piston. The dual clutch device is a so-called parallel dual clutch device, in which the two plate assemblies are consequently not nested radially, as is the case in a concentric dual clutch device, but instead are arranged so as to be staggered axially. In parallel dual clutch devices, the two plate assemblies do not necessarily have to overlap when viewed in an axial direction but it is advantageous if the two plate assemblies viewed in an axial direction overlap at least partially and preferably completely. The first and second actuating pistons each have an actuating direction, wherein the two actuating directions are mutually opposed. In other words, the actuating pistons can be moved either toward one another or away from one another in the actuating directions. In contrast to the dual clutch device known from DE 101 46 606 A1, the first inner plate carrier forms the input side of the first multiplate clutch, while the inner plate carrier of the second multiplate clutch forms the input side of the second multiplate clutch. Consequently, the first outer plate carrier forms the output side of the first multiplate clutch, while the second outer plate carrier forms the output side of the second multiplate clutch. Since the output sides of both multiplate clutches are each formed by the outer plate carrier, a particularly simple, compact and easily assembled construction of the parallel dual clutch device can be achieved.

In a preferred embodiment of the dual clutch device according to the invention, this is designed as a wet dual clutch device. Cooling and lubricating oil is preferably used as a cooling and lubricating medium, which preferably brings about the cooling and lubrication of the plate assemblies.

As already indicated, the first and second actuating pistons have mutually opposite actuating directions. In another preferred embodiment of the dual clutch device according to the invention, the actuating directions are opposed to one another in such a way that the actuating pistons are moved away from one another in the case of a movement in the actuating direction thereof. Inter alia, this allows the drives for the actuating pistons to be arranged relatively close to one another, that is to say, for example, enables the associated pressure application chambers to be arranged close together if the actuating pistons are hydraulically actuable actuating pistons. Thus, said pressure application chambers can be arranged on the mutually facing sides of the actuating pistons, for example. In each case, it is possible to achieve compact construction of the dual clutch device.

In a particularly preferred embodiment of the dual clutch device according to the invention, the two inner plate carriers are connected for conjoint rotation to a tubular clutch main hub, which is supported rotatably on a fixed carrying tube. Consequently, the tubular clutch main hub, which can likewise be regarded as the input side of the dual clutch device by virtue of the connection for conjoint rotation to the two inner plate carriers, is not supported completely, and preferably not at all, on one of the transmission input shafts but is rotatably supported on said fixed carrying tube. First of all, this has the advantage that any vibrations of the shaft of the drive unit can be transmitted only to a relatively small extent or not at all to the transmission input shafts via the dual clutch device. Moreover, the use of the fixed carrying tube has the advantage that the clutch or a part thereof does not have to project into the transmission housing at the end in order to be supported in a radially outward direction on the transmission housing, something that would lead to a greater axial overall length of the design. In this embodiment, it is furthermore preferred if the carrying tube extends into the clutch main hub, and a clutch input shaft, the first transmission input shaft and/or the second transmission input shaft preferably extend into the carrying tube in order to obtain a particularly compact construction of the dual clutch device. In this embodiment, it is furthermore particularly preferred if the actuating pistons are arranged between the inner plate carriers in the axial direction, which carriers are connected to the tubular clutch main hub, in order to make the construction of the dual clutch device particularly compact.

In an advantageous embodiment of the dual clutch device according to the invention, the abovementioned carrying tube is arranged on a fixed housing part. The fixed housing part can be part of a transmission housing or of a drive or motor housing, for example. In this way, it is possible to support any vibrations within the drive train reliably on one of said fixed housing parts. In this embodiment, it is furthermore preferred if the two multiplate clutches are supplied via the housing part and the carrying tube, particularly preferably by means of a rotary union between the carrying tube and the clutch main hub, with oil for cooling and lubricating the plate assemblies and/or with pressurized oil for actuating the actuating pistons. In this way, for example, it is possible to form appropriate conduits within the housing part and the carrying tube. In this embodiment, it is furthermore preferred if the oil also serves as a compensating oil for supplying any compensating chambers assigned to the actuating piston.

In another advantageous embodiment of the dual clutch device according to the invention, the first actuating piston is assigned a first pressure application chamber and the second actuating piston is assigned a second pressure application chamber, wherein the pressure application chambers are preferably chambers for accepting a hydraulic medium, such as hydraulic oil. The pressure application chambers, within which a pressure increase brings about a movement of the respective actuating piston in the actuating direction thereof, are arranged on the mutually facing sides of the actuating pistons. In other words, it is possible here to provide closely adjacent pressure application chambers, which can therefore contribute to a compact construction of the dual clutch device and to simplicity of supply with pressure medium. In this embodiment, it is preferred if the pressure application chambers are separated from one another in the axial direction by a partition arrangement connected to the clutch main hub, if appropriate for conjoint rotation. This partition arrangement is formed, in the radially outer end section thereof, by two partition walls, which are spaced apart in the axial direction. In other words, the partition walls provided in the radially outer end section of the partition arrangement are not brought together in the axial direction or supported on one another in the axial direction, especially since the stability of the partition walls is sufficient to withstand the pressure within the pressure application chambers. Thus, a particularly simple, small and lightweight partition arrangement between the pressure application chambers is provided here, contributing to a simplification of the construction of the dual clutch device. It is preferred here if the partition walls are designed as formed sheet-metal parts in order to achieve a particularly lightweight and yet stable construction of the partition arrangement which is furthermore particularly simple to produce. In order furthermore to be able to dispense with additional supporting and guiding measures for the actuating pistons in this embodiment, the actuating pistons can be supported or are supported, particularly preferably in the radial direction and/or in the axial direction, on the associated partition wall. Thus, in this embodiment, it is, in particular, preferred if the actuating piston is supported in an axial direction on the associated partition wall in the rest position of said piston, into which it is preferably preloaded, with the result that the partition wall accordingly serves as a stop here.

In another preferred embodiment of the dual clutch device according to the invention, the actuating pistons are each assigned at least one return element. This at least one return element can be a return spring, for example, particularly preferably a helical spring. In order to be able to take the return force of the respective return element within the dual clutch device in a particularly reliable manner, the engagement surface of the return element on the respective actuating piston overlaps, when viewed in the axial direction, with a supporting surface for supporting the actuating piston on the associated partition wall in an axial direction. It is preferred here if the degree of overlap is at least 90%, particularly preferably 100%, of the engagement surface of the return element on the respective actuating piston. The engagement surface of the return element on the respective actuating piston can be a circular area or an area in the form of a circular ring, for example, in the case of a return element designed as a helical spring. However, it is preferred if it is that engagement surface of the return element on the respective actuating piston on which the return element acts directly, it also being possible for the return element to be formed from a plurality of parts, that is to say, for example, from a helical spring and a supporting part at the end.

In order to further simplify the construction of the dual clutch device, the partition arrangement is designed to be so short in a radially outward direction that the outside diameter thereof is less than the outside diameter of the actuating pistons, preferably less than the inside diameter of the plate assemblies. The partition arrangement is therefore of very small design and does not, for instance, extend as far outward in a radial direction as the outer plate carriers or the like, as is the case in DE 101 46 606 A1, for example, and, as a result, it is possible to achieve an even more compact, simpler and lighter construction of the dual clutch device. The function of the partition arrangement, namely, on the one hand, to separate the pressure application chambers from one another and, on the other hand, to effect support for the actuating pistons if appropriate, is unaffected by this. In order to be able to use outer plates of similar design, preferably the same outer plates, in both plate assemblies, and to bring about a substantial overlap between the plate assemblies arranged in parallel when they are considered in the axial direction, the outer plate carriers in another particularly preferred embodiment of the dual clutch device according to the invention each have a tubular outer plate carrying section, the first or second outer plate carrier having a tubular bridging section, relative to which the outer plate carrying section of the first or second outer plate carrier is offset radially inward while the bridging section bridges the outer plate carrying section of the other outer plate carrier radially on the outside. In order to allow simple assembly in this embodiment, that is to say, for example, in order to be able to introduce the outer plate carrying section of the other outer plate carrier easily into the bridging section of the first or second outer plate carrier, the outer plate carrying section of the first or second outer plate carrier in this embodiment is preferably connected releasably and for conjoint rotation to the bridging section. In this way, the outer plate carrying section of the other outer plate carrier can be introduced first into the bridging section of the first or second outer plate carrier, after which the outer plate carrying section of the first or second outer plate carrier is connected releasably and for conjoint rotation to the bridging section. In this context, one could also say that the outer plate carrying section of the first or second outer plate carrier is designed as a separate component. In order to simplify the connection of the outer plate carrying section of the first or second outer plate carrier to the bridging section thereof, it is particularly preferred in this embodiment if said outer plate carrying section can be joined together with or is joined together with the bridging section in the axial direction.

In another advantageous embodiment of the dual clutch device according to the invention, which is based on the embodiment described above, the outer plate carrying sections of the outer plate carriers have the same inside diameter. In this case, it is furthermore preferred if the first and second plate assemblies have the same outer plates, making it possible to reduce the number of different components thanks to the identical inside diameter of the outer plate carrying sections.

In order, on the one hand, to ensure a reliable connection of the outer plate carrying section to the bridging section for conjoint rotation and, on the other hand, to allow simple assembly and production, the outer plate carrying section which can be joined together with or is joined together with the bridging section in another preferred embodiment of the dual clutch device according to the invention has projections which protrude radially outward and can be introduced or are introduced in an axial direction into recesses in the end of the tubular bridging section. In order to simplify the production of the outer plate carrying section, the protruding projections are preferably provided on the end of the outer plate carrying section and are particularly preferably formed by sheet-metal tongues that are bent radially outward. In this embodiment, it is furthermore preferred if the outer plate carrying section, which can be joined together with or is joined together with the bridging section, can be fixed or is fixed on the bridging section in an axial direction, particularly preferably by means of a retaining ring, if appropriate a retaining ring situated on the inside. The internal arrangement is preferred insofar as the retaining ring cannot expand and come loose in an unwanted manner during the operation of the dual clutch device or during the rotation of the bridging section.

In another particularly advantageous embodiment of the dual clutch device according to the invention, the dual clutch device has a clutch input shaft. Although the words "clutch input shaft" are used here, the clutch input shaft may also alternatively be referred to as a clutch input hub. The clutch input shaft extends into the clutch main hub and preferably also into the abovementioned carrying tube in order to be in rotary driving connection with the clutch main hub via a rotary driving part. Here, the rotary driving part can be designed either to be separate from the clutch input shaft or integral with the clutch input shaft, the latter option being preferred. Irrespective of the respective design of the rotary driving part, this embodiment of the dual clutch device according to the invention has the advantage that the torque of the clutch input shaft can be transmitted directly to the clutch main hub, while it is possible to dispense with an expensive clutch housing to house the multiplate clutches and transmit the torque. Only said rotary driving part of small construction is required to transmit the torque of the clutch input shaft to the clutch main hub, and it is thus possible, on the one hand, to reduce the weight and, on the other hand, the outlay on assembly or production for the dual clutch device. In this embodiment, the rotary driving part is preferably made to approach the clutch main hub in a radially outward direction in order to avoid restricting the installation space for the multiplate clutches and the associated elements, such as the actuating pistons, and to obtain the rotary driving connection between the clutch input shaft and the clutch main hub over a relatively short distance. In order to further enhance the latter advantage, it is furthermore particularly preferred in this embodiment if the rotary driving part is in rotary driving connection with the radially inward-facing side of the clutch main hub.

In order to achieve a rotary driving connection between the clutch input shaft, on the one hand, and the clutch main hub, on the other hand, which ensures both reliable rotary driving and simplicity of assembly, the rotary driving part in another preferred embodiment of the dual clutch device according to the invention has external toothing, which engages in internal toothing or end toothing on the clutch main hub, wherein the external toothing, together with the internal toothing or the end toothing, preferably forms a spline system. In order to simplify the mounting of the clutch main hub on the abovementioned carrying tube, by improving the ability to monitor the mounting, for example, the internal toothing on the clutch main hub particularly preferably has an inside diameter which is greater than the smallest inside diameter of the clutch main hub.

In order to achieve secure arrangement of the clutch input shaft relative to the clutch main hub, with which the clutch input shaft is in rotary driving connection via the rotary driving part, there is in another advantageous embodiment of the dual clutch device according to the invention at least one radial bearing, preferably a rolling contact bearing, particularly preferably a ball bearing, arranged between the clutch input shaft and the carrying tube. In this way, not only the clutch main hub but also the clutch input shaft is arranged or supported reliably on the carrying tube. In this embodiment, it is furthermore preferred if the radial bearing is arranged between the inner side of the carrying tube and the outer side of the clutch input shaft in order to achieve a space-saving arrangement.

In another advantageous embodiment of the dual clutch device according to the invention, at least one radial bearing, preferably a rolling contact bearing, particularly preferably a ball bearing, is arranged between the clutch main hub and the carrying tube, if appropriate between the inner side of the clutch main hub and the outer side of the carrying tube. Consequently, particularly secure arrangement of the clutch main hub on the carrying tube is achieved in this embodiment.

In another preferred embodiment of the dual clutch device according to the invention, the dual clutch device is arranged in a housing bell, which is closed by a removable housing cover. The housing bell is preferably a transmission housing bell, while the removable housing cover is preferably formed by a transmission housing cover for closing the transmission housing bell. As already indicated above, the carrying tube is preferably arranged on a fixed housing part, with the fixed housing part preferably being formed by the housing cover in this embodiment. In this embodiment, the housing cover, the carrying tube secured on the housing cover and the dual clutch device supported on the carrying tube can form a module which is introduced as a whole into the housing bell in order to establish the connection with the transmission input shafts and then to connect or screw the housing cover to the housing bell. This considerably simplifies assembly.

In another advantageous embodiment of the dual clutch device according to the invention, the inner plate carriers each have a tubular inner plate carrying section for holding the inner plates and a radial supporting section, by means of which the tubular inner plate carrying section is connected to the clutch main hub for conjoint rotation. In this embodiment, it is preferred if at least one radial supporting section, and preferably both, is extended outward in a radial direction beyond the associated inner plate carrying section in such a way that the associated plate assembly can be supported or is supported in the axial direction on the radial supporting section. It is thus possible by simple means to provide an abutment or stop for the plate assembly acted upon by the force of the actuating piston. In this embodiment, it is particularly preferred if the radial supporting section has a protrusion for supporting the plate assembly in the region in which said supporting section is extended beyond the associated inner plate carrying section, this protrusion preferably being of annular design in order to take account of the annular shape of the adjoining plates of the plate assembly.

In another particularly preferred embodiment of the dual clutch device according to the invention, one of the radial supporting sections of the inner plate carriers is extended outward in a radial direction beyond the associated inner plate carrying section in such a way that it forms a carrying section for the rotor of an electric machine. In this embodiment, particularly reliable support for the rotor on the carrying tube by means of the radial supporting section and the clutch main hub connected to the radial supporting section is achieved.

Since the carrying section of the radial supporting section, which is extended beyond the associated inner plate carrying section, furthermore only has the function of carrying the rotor, it can be matched in a simple manner to the function which it is intended to perform without affecting other components of the dual clutch device too severely, as would be the case, for example, where the rotor is arranged on the outer plate carrier known from DE 101 46 606 A1. In this embodiment, it is furthermore preferred if the carrying section is arranged outside the outer plate carrier in a radial direction, is of tubular design and/or surrounds at least one of the outer plate carriers on the outside in a radial direction in order to obtain a particularly compact construction and a small axial overall length of the dual clutch device.

The invention is explained in greater detail below by means of an illustrative embodiment with reference to the attached drawings. The single FIGURE shows a sectioned side view of one embodiment of the dual clutch device according to the invention within a drive train.

The FIGURE shows one embodiment of the parallel wet dual clutch device 2 within a drive train of a motor vehicle, wherein the dual clutch device 2 is arranged between a drive unit 4, which is preferably designed as an internal combustion engine, and a transmission 6. While the drive unit 4 is shown only schematically in the FIGURE, a transmission housing 8, a first transmission input shaft 10, a second transmission input shaft 12 and a transmission housing cover 14 of the transmission 6 are shown.

The dual clutch device 2 is arranged in a transmission housing bell, which is formed by the transmission housing 8 and is closed by the transmission housing cover 14, wherein the transmission housing cover 14 is fastened removably on the transmission housing bell of the transmission housing 8. The first transmission input shaft 10 is designed at least partially as a hollow shaft, into which the second transmission input shaft 12 extends in the axial direction 16, 18, and it is therefore also possible to refer to the second transmission input shaft 12 as an inner transmission input shaft 12. The two transmission input shafts 10, 12 are arranged concentrically or in a radially nested manner. In addition to the opposed axial directions 16, 18 already mentioned, in which the axis of rotation 20 of the dual clutch device 2 also extends, the mutually opposed radial directions 22, 24 and the mutually opposed circumferential directions 26, 28 of the dual clutch device 2 and of the drive train are furthermore indicated in the FIGURE by means of appropriate arrows.

The dual clutch device 2 has a first multiplate clutch 30 and a second multiplate clutch 32. While the first multiplate clutch 30 is assigned to the first transmission input shaft 10 in order selectively to transmit a torque between the drive unit 4 and the first transmission input shaft 10, the second multiplate clutch 32 is assigned to the second transmission input shaft 12 in order selectively to transmit a torque between the drive unit 4 and the second transmission input shaft 12. The first multiplate clutch 30 has a first outer plate carrier 34, a first inner plate carrier 36 and a first plate assembly 38. In a corresponding way, the second multiplate clutch 32 has a second outer plate carrier 40, a second inner plate carrier 32 and a second plate assembly 44. While the first plate assembly 38 is assigned a hydraulically drivable first actuating piston 46, the second plate assembly 44 is assigned a hydraulically drivable second actuating piston 48. The first actuating piston 46 has a first actuating direction 50, which, in the present embodiment, corresponds to axial direction 18 while the second actuating piston 48 has a second actuating direction 52, which, in the embodiment illustrated, corresponds to axial direction 16. In other words, the actuating directions 50, 52 of the actuating pistons 46, 48 are mutually opposed, with the actuating pistons 46, 48 being moved apart in the axial direction 16, 18 when they are moved in their actuating directions 50, 52. Here, the term "actuating directions 50, 52" is intended to mean the directions in which the actuating pistons 46, 48 are moved in order to compress the associated plate assemblies 38 and 44.

The second outer plate carrier 40 is composed essentially of a radial supporting section 54 extending in the radial direction 22, 24 and of a tubular outer plate carrying section 56, wherein the outer plate carrying section 56 integrally adjoins that end of the radial supporting section 54 which points outward in radial direction 22 and extends in axial direction 18 from the radial supporting section 54. The outer plate carrying section 56 has an inside diameter $i_1$. The second outer plate carrier 40 is furthermore connected, by means of the end thereof which points inward in radial direction 24, to the second transmission input shaft 12 for conjoint rotation via a hub 58.

The first outer plate carrier 34 has a radial supporting section 60, which is in rotary driving connection with the first transmission input shaft 10 in radially inward direction 24 by means of a hub 62. Both hub 58 and hub 62 are connected to the associated transmission input shafts 12 and 10 by a kind of spline system. Moreover, the first outer plate carrier 34 has a tubular bridging section 64, which extends in axial direction 18 from that end of the radial supporting section 60 which points outward in radial direction 22 and, in the process, bridges the outer plate carrying section 56 of the second outer plate carrier 40 radially on the outside. Moreover, the first outer plate carrier 34 has an outer plate carrying section 66 for holding the outer plates of the first plate assembly 38, but it is not formed integrally with the first outer plate carrier 34. On the contrary, the outer plate carrying section 66 is connected releasably and for conjoint rotation to the bridging section 64 of the first outer plate carrier 34, for which purpose the outer plate carrying section 66 can be joined together or is joined together in axial direction 16 with the bridging section 64. It can furthermore be seen from the FIGURE that the outer plate carrying section 66 is offset inward in radial direction 24 relative to the bridging section 64 of the first outer plate carrier 34, with the result that the outer plate carrying section 66, which, like outer plate carrying section 56, is tubular, has an inside diameter $i_2$ which corresponds to the inside diameter $i_1$ of the outer plate carrying section 56, thus enabling the same outer plates to be used in the plate assemblies 38, 44 as in the embodiment illustrated.

In order to enable the abovementioned ability of the outer plate carrying section 66 to be joined together with the bridging section 64, the outer plate carrying section 66 has projections 68, which protrude outward in radial direction 22 in the region of said carrying section which points in axial direction 18 or faces away from the bridging section 64 and are preferably formed by tongues bent out from the outer plate carrying section 66. Furthermore, the bridging section 64 has recesses 70 in its end pointing in axial direction 18 or its end facing the outer plate carrying section 66 to be fastened, into which recesses the protruding projections 68 can be introduced or are introduced in axial direction 16. While the fixing of the outer plate carrying section 66 in axial direction 16 on the bridging section 64 can be accomplished by means of the protruding projections 68, the fixing of the outer plate carrying section 66 in axial direction 18 on the bridging section 64 is accomplished by means of an internal retaining ring 72. The inside diameter of the bridging section 64 is chosen in such a way that the second outer plate carrier 40 can be introduced into the bridging section 64 in axial direction 16 before the outer plate carrying section 66 is connected to the bridging section 64.

The two inner plate carriers 36, 42 are spaced apart in the axial direction 16, 18 and each have a tubular inner plate carrying section 74, 76 and a radial supporting section 78, 80. While the inner plate carrying section 74 extends in axial direction 16 from the radial supporting section 78, i.e. in the direction of the second inner plate carrier 42, the inner plate carrying section 76 of the second inner plate carrier 42 extends in axial direction 18 from the radial supporting section 80, i.e. in the direction of the first inner plate carrier 36, with both inner plate carrying sections 74, 76 having the same outside diameter, thus enabling the same inner plates to be used for the first and second plate assemblies 38, 44, as is the case in the embodiment illustrated. Both inner plate carriers 36, 42 are connected in a radially inward direction 24 for conjoint rotation, via the radial supporting sections 78, 80, to a tubular clutch main hub 82, further details of which will be given below.

Both radial supporting sections 78, 80 are furthermore extended outward in radial direction 22 beyond the associated inner plate carrying sections 74 and 76, respectively, in such a way that the associated first plate assembly 38 can be supported or is supported in axial direction 18 on the radial supporting section 78, and the second plate assembly 44 can be supported or is supported in axial direction 16 on the radial supporting section 80. In this area, the radial supporting sections 78 and 80 have annular protrusions 84 and 86, or protrusions which run around in the circumferential direction 26, 28, in axial directions 16 and 18 for supporting the first and second plate assemblies 38, 44.

As can be seen from the FIGURE, the radial supporting section 78 of the first inner plate carrier 36 is furthermore extended outward in radial direction 22 beyond the associated inner plate carrying section 74 and the protrusion 84 in such a way that it forms a carrying section 88 for the rotor 90 of an electric machine 92, with the stator 94 of the electric machine 92 being arranged on the transmission housing 8, to be more precise on the transmission housing cover 14 of the transmission housing 8. The carrying section 88 is arranged to the outside of the outer plate carriers 34, 40 in radial direction 22 and is of tubular design, wherein the tubular carrying section 88 extends in the axial direction 16, 18 in such a way that it surrounds at least the outer plate carrier 34 on the outside in radial direction 22. As a result, not only is a particularly compact construction with a short axial overall length achieved but also particularly stable support for the rotor 90 via the radial supporting section 78 and the clutch main hub 82 on the carrying tube, which will be described in greater detail below, is possible. As can be seen from the FIGURE, the electric machine 92 should likewise be arranged so as to be nested in the radial direction 22, 24 with the dual clutch device 2.

As already indicated above, the two inner plate carriers 36, 42 are connected for conjoint rotation to the tubular clutch main hub 82 on the inside in radial direction 24. The clutch main hub 82 is supported rotatably on a fixed carrying tube 96 in radial direction 24 since the carrying tube 96 extends into the tubular clutch main hub 82. In order to be able to provide this fixed carrying tube 96, the fixed carrying tube 96 is arranged or secured on a fixed housing part, in the embodiment illustrated on the transmission housing cover 14 of the transmission housing 8. Thus, the fixed carrying tube 96 is arranged on that side of the transmission housing cover 14 which faces the dual clutch device 2 so that it can extend from there into the clutch main hub 82 in axial direction 16.

The clutch main hub 82 has an inner side 98, which faces inward in radial direction 24 and faces an outer side 100 of the fixed carrying tube 96, said outer side facing outward in radial direction 22. Arranged between the inner side 98 and the outer side 100 are two radial bearings 102, which are spaced apart in the axial direction 16, 18, are designed as rolling contact or ball bearings and allow reliable rotatable support for the clutch main hub 82 on the fixed carrying tube 96. However, the fixed carrying tube 96 serves not only to support the clutch main hub 82; on the contrary, the multiplate clutches 30, 32 can be supplied with oil for cooling and lubricating the plate assemblies 38, 44 and/or pressurized oil for actuating the actuating pistons 46, 48 via the transmission housing cover 14 and the carrying tube 96 by means of a rotary union 104 between the carrying tube 96 and the clutch main hub 82, for which purpose appropriate conduits are provided within the transmission housing cover 14 and the fixed carrying tube 96, although these are not shown in the FIGURE. Consequently, it is a particularly simple matter to supply oil and there is no need for this to be achieved by means of cavities, conduits or the like within the transmission input shafts 10, 12.

In order to be able to transmit the torque of the drive unit 4 selectively to one of the transmission input shafts 10, 12 via the dual clutch device 2, a clutch input shaft 106 is provided, which may also be referred to as a clutch input hub. The clutch input shaft 106 extends from the drive unit 4 in axial direction 16, through an opening in the transmission housing cover 14, into the carrying tube 96 and projects from the carrying tube 96 in axial direction 16. As can be seen from the FIGURE, the clutch input shaft 106 thus extends both into the carrying tube 96 and into the clutch main hub 82 arranged on the carrying tube 96. In order to provide reliable support for the clutch input shaft 106, a radial bearing 108, which is designed as a rolling contact or ball bearing, is arranged between the clutch input shaft 106 and the carrying tube 96. To be more precise, the radial bearing 108 is arranged between the inner side 110 of the carrying tube 96, which faces the clutch input shaft 106 in radial direction 24, and the outer side 112 of the clutch input shaft 106, which faces outward in radial direction 22. It is thereby possible to achieve a particularly compact construction.

As already indicated above, the clutch input shaft 106 projects from the carrying tube 96 in axial direction 16. In this section, a rotary driving part 114 is provided, which, in the embodiment illustrated, is formed integrally with the clutch input shaft 106 and is in rotary driving connection with the clutch main hub 82. For this purpose, the rotary driving part 114, which is preferably in the form of an annular disk, projects outward in radial direction 22 beyond the outer side 112 of the clutch input shaft 106 and is brought up to the clutch main hub 82 in a radially outward direction 22. In this case, the rotary driving part 114 is in rotary driving connection with the radially inward-facing side of the clutch main hub 82 or inner side 98 of the clutch main hub 82. In order to achieve this rotary driving connection, the rotary driving part 114 has external toothing 116, which engages in a radially outward direction 22 in internal toothing 118 on the clutch main hub 82. As an alternative, the internal toothing 118 could also be designed as end toothing. Together with the internal toothing 118, the external toothing 116 forms a spline system, with the result that the internal toothing 118 can be inserted or is inserted into the external toothing 116 in axial direction 18. As can be seen from the FIGURE, the internal toothing 118 has an inside diameter $i_3$ which is greater than the smallest inside diameter $i_4$ of the clutch main hub 82.

From the above description, it is apparent that the torque of the drive unit 4 is transmitted via the clutch input shaft 106, the rotary driving part 104 and the clutch main hub 82 to the inner plate carriers 36, 42. Consequently, the first inner plate carrier 36 forms the input side of the first multiplate clutch 30, while the second inner plate carrier 42 forms the input side of the second multiplate clutch 32. In corresponding fashion, the first outer plate carrier 34 of the first multiplate clutch 30 serves as the output side of the latter, while the second outer plate carrier 40 functions as the output side of the second multiplate clutch 32. It can furthermore be seen from the FIGURE that the second transmission input shaft 12 likewise extends in axial direction 18 into the carrying tube 96 and the clutch main hub 82, for which purpose the clutch input shaft 106 has an end recess 120 facing in axial direction 16, into which the second transmission input shaft 12 as well as part of the hub 58 enters in axial direction 18.

The actuating pistons 46, 48, which have already been mentioned above, are arranged between the inner plate carriers 36, 42 in the axial direction 16, 18. The two actuating pistons 46, 48 are each hydraulically actuable actuating pistons, the first actuating piston 46 being assigned a first pressure application chamber 122 and the second actuating piston 48 being assigned a second pressure application chamber 124. Both pressure application chambers 122, 124 can be supplied with pressurized oil via the abovementioned rotary union 104 in order to move the actuating pistons 46 and 48 in actuating directions 50 and 52, respectively, and bring about compression of the plate assemblies 38 and 44, respectively. From the FIGURE, it can be seen that the pressure application chambers 122, 124 are each arranged on the mutually facing sides of the actuating pistons 46, 48, with the pressure application chambers 122, 124 being separated from one another in the axial direction 16, 18 only by a partition arrangement connected for conjoint rotation to the clutch main hub 82, the partition arrangement being denoted in the FIGURE by reference sign 126.

The partition arrangement 126 has a radially inner end section 128 and a radially outer end section 130, which follows the radially inner end section 128 in a radially outward direction 22. The radially outer end section 130 is formed by two partition walls 132, 134 spaced apart in the axial direction 16, 18 and designed as formed sheet-metal parts. While partition wall 132 delimits the first pressure application chamber 122 in axial direction 16, partition wall 134 delimits the second pressure application chamber 124 in axial direction 18. Since the partition walls 132, 134 have adequate stability, they do not have to be supported against one another in the axial direction 16, 18; on the contrary, they are spaced apart in the axial direction 16, 18 in the radially outer end section 130 of the partition arrangement 126 in order to achieve a simplification of the construction of the dual clutch device 2, which is furthermore associated with a reduction in the weight of the dual clutch device 2. Moreover, the partition walls 132 and 134 are matched to the associated actuating pistons 46 and 48, respectively, in such a way that the actuating pistons 46 and 48 can be supported or are supported in a radially inward direction 24 and in axial directions 16 and 18 on the partition walls 132 and 134, respectively. The latter is the case when the actuating pistons 46 and 48 are returned to the rest position, in which the actuating pistons 46 and 48 do not compress the plate assemblies 38 and 44, as shown in the FIGURE. Consequently, the respective partition wall 132, 134 also serves as an axial stop for the associated actuating piston 46 or 48.

In order to further simplify the construction of the dual clutch device 2, the partition arrangement 126 is made so short in a radially outward direction 22 that the outside diameter $a_1$ thereof is less than the outside diameter $a_2$ of the actuating pistons 46, 48 and less than the inside diameter $i_5$ of the plate assemblies 38, 44.

In order to return the actuating pistons 46, 48 to the rest position assumed in the FIGURE, the actuating pistons 46, 48 are each assigned at least one return element 136, 138, the return elements 136, 138 here being formed by helical springs which return the first actuating piston 46 in axial direction 16 and the second actuating piston 48 in axial direction 18. When viewed in the axial direction 16, 18, the engagement surfaces 140 of the return elements 136 and 138 on the actuating pistons 46 and 48, which surfaces are illustrated by thicker lines in the FIGURE, are arranged in an overlapping manner with a supporting surface 142 for supporting the actuating pistons 46 and 48 in the axial direction 16 or 18 on the partition walls 132 and 134. The degree of overlap here is preferably at least 90%, particularly preferably 100%, of the engagement surface 140. One of the effects of this is to optimize the bending stress on the actuating pistons 46 and 48 in the rest position thereof.

LIST OF REFERENCE SIGNS 2 dual clutch device
4 drive unit
6 transmission
8 transmission housing
10 first transmission input shaft
12 second transmission input shaft
14 transmission housing cover
16 axial direction
18 axial direction
20 axis of rotation
22 radial direction
24 radial direction
26 circumferential direction
28 circumferential direction
30 first multiplate clutch
32 second multiplate clutch
34 first outer plate carrier
36 first inner plate carrier
38 first plate assembly
40 second outer plate carrier
42 second inner plate carrier
44 second plate assembly
46 first actuating piston
48 second actuating piston
50 first actuating direction
52 second actuating direction
54 radial supporting section
56 outer plate carrying section
58 hub
60 radial supporting section
62 hub
64 bridging section
66 outer plate carrying section
68 protruding projection
70 recesses
72 retaining ring
74 inner plate carrying section
76 inner plate carrying section
78 radial supporting section
80 radial supporting section
82 clutch main hub
84 protrusion
86 protrusion
88 carrying section 90 rotor
92 electric machine
94 stator
96 fixed carrying tube
98 inner side
100 outer side
102 radial bearing
104 rotary union
106 clutch input shaft
108 radial bearing
110 inner side
112 outer side
114 rotary driving part
116 external toothing
118 internal toothing
120 end recess
122 first pressure application chamber
124 second pressure application chamber
126 partition arrangement
128 radially inner end section
130 radially outer end section
132 partition wall
134 partition wall
136 return element
138 return element
140 engagement surface
142 supporting surface
$a_1$ outside diameter
$a_2$ outside diameter
$i_1$ inside diameter
$i_2$ inside diameter
$i_3$ inside diameter
$i_4$ smallest inside diameter
$i_5$ inside diameter

The invention claimed is:

1. A parallel dual clutch device for arrangement in a drive train of a motor vehicle, between a drive unit and a transmission, which has a first multiplate clutch assigned to a first transmission input shaft and having a first plate assembly, a first actuating piston, a first inner plate carrier and a first outer plate carrier for selective torque transmission between the drive unit and the first transmission input shaft, and has a second multiplate clutch assigned to a second transmission input shaft and having a second plate assembly, a second actuating piston, a second inner plate carrier and a second outer plate carrier for selective torque transmission between the drive unit and the second transmission input shaft, wherein the actuating pistons have mutually opposed actuating directions wherein the inner plate carriers are each designed as the input side and the outer plate carriers are each designed as the output side of the first and second multiplate clutches wherein the first actuating piston is assigned a first pressure application chamber and the second actuating piston is assigned a second pressure application chamber, which are arranged on the mutually facing sides of the actuating pistons, wherein the pressure application chambers are separated from one another in the axial direction by a partition arrangement connected to a clutch main hub for conjoint rotation, said partition arrangement being formed, at least in the radially outer end section thereof, by two partition walls, which are spaced apart in the axial direction, are designed as formed sheet-metal parts, and on which the actuating pistons can be supported or are supported in the radial direction or in the axial direction.

2. The dual clutch device as claimed in claim 1, wherein the two inner plate carriers are connected for conjoint rotation to the tubular clutch main hub, which is supported rotatably on a fixed carrying tube.

3. The dual clutch device as claimed in claim 2, wherein the carrying tube is arranged on a fixed housing part.

4. The dual clutch device as claimed in claim 2, wherein a clutch input shaft is provided, which extends into the clutch main hub and also into the carrying tube and is in rotary driving connection with the clutch main hub via a rotary driving part, which is formed integrally with the clutch input shaft, wherein the rotary driving part is made to approach the clutch main hub in a radially outward direction and is in rotary driving connection with the radially inward-facing side of the clutch main hub.

5. The dual clutch device as claimed in claim 4, wherein the rotary driving part has external toothing, which engages in internal toothing or end toothing on the clutch main hub, wherein the external toothing, together with the internal toothing or the end toothing forms a spline system, and the internal toothing has an inside diameter ($i_3$) which is greater than the smallest inside diameter ($i_4$) of the clutch main hub.

6. The dual clutch device as claimed in claim 5, wherein at least one radial bearing comprising a rolling contact bearing, is arranged between the clutch input shaft and the carrying tube between the inner side of the carrying tube and the outer side of the clutch input shaft.

7. The dual clutch device as claimed in claim 2, wherein the dual clutch device is arranged in a housing bell comprising a transmission housing bell, which is closed by a removable housing cover comprising a transmission housing cover, wherein the carrying tube is arranged on the housing cover.

8. The dual clutch device as claimed in claim 2, wherein the inner plate carriers each have a tubular inner plate carrying section and a radial supporting section by means of which the tubular inner plate carrying section is connected to the clutch main hub for conjoint rotation, wherein at least one radial supporting section is extended outward in a radial direction beyond the associated inner plate carrying section in such a way that the associated plate assembly is supported in the axial direction on the at least one radial supporting section, and the at least one radial supporting section has a protrusion for supporting the plate assembly.

9. The dual clutch device as claimed in claim 8, wherein one of the radial supporting sections is extended outward in a radial direction beyond the associated inner plate carrying section in such a way that it forms a carrying section for the rotor of an electric machine, wherein the carrying section is arranged outside at least one of the outer plate carriers in a radial direction, is of tubular design or surrounds said at least one of the outer plate carriers on the outside in a radial direction.

10. The dual clutch device as claimed in claim 1, wherein the actuating pistons are each assigned at least one return element with an engagement surface, wherein, when viewed in the axial direction, the engagement surface of the return element on the respective actuating piston overlaps with a supporting surface for supporting the actuating piston on the partition wall in the axial direction, wherein the degree of overlap is at least 90%, or 100%, of the engagement surface.

11. The dual clutch device as claimed in claim 10, wherein the partition arrangement is designed to be so short in a radially outward direction that the outside diameter ($a_1$) thereof is less than the outside diameter ($a_2$) of the actuating pistons.

12. The dual clutch device as claimed in claim 10, wherein the outer plate carriers each have a tubular outer plate carrying section, wherein the first or second outer plate carrier has a tubular bridging section, relative to which the outer plate carrying section of the first or second outer plate carrier is offset radially inward and which bridges the outer plate carrying section of the other outer plate carrier radially on the outside, wherein the outer plate carrying section of the first or second outer plate carrier is connected releasably and for conjoint rotation to the bridging section and is joined together with the bridging section in the axial direction.

13. The dual clutch device as claimed in claim 12, wherein the outer plate carrying sections of the outer plate carriers have the same inside diameter ($i_1$, $i_2$), wherein the first and second plate assemblies have identical outer plates and identical outer plate carrying sections.

* * * * *